Oct. 6, 1931.    S. J. CARROLL    1,826,688
CELLULOSIC COMPOSITION OF MATTER CONTAINING A BROMO COMPOUND
Filed Aug. 30, 1929
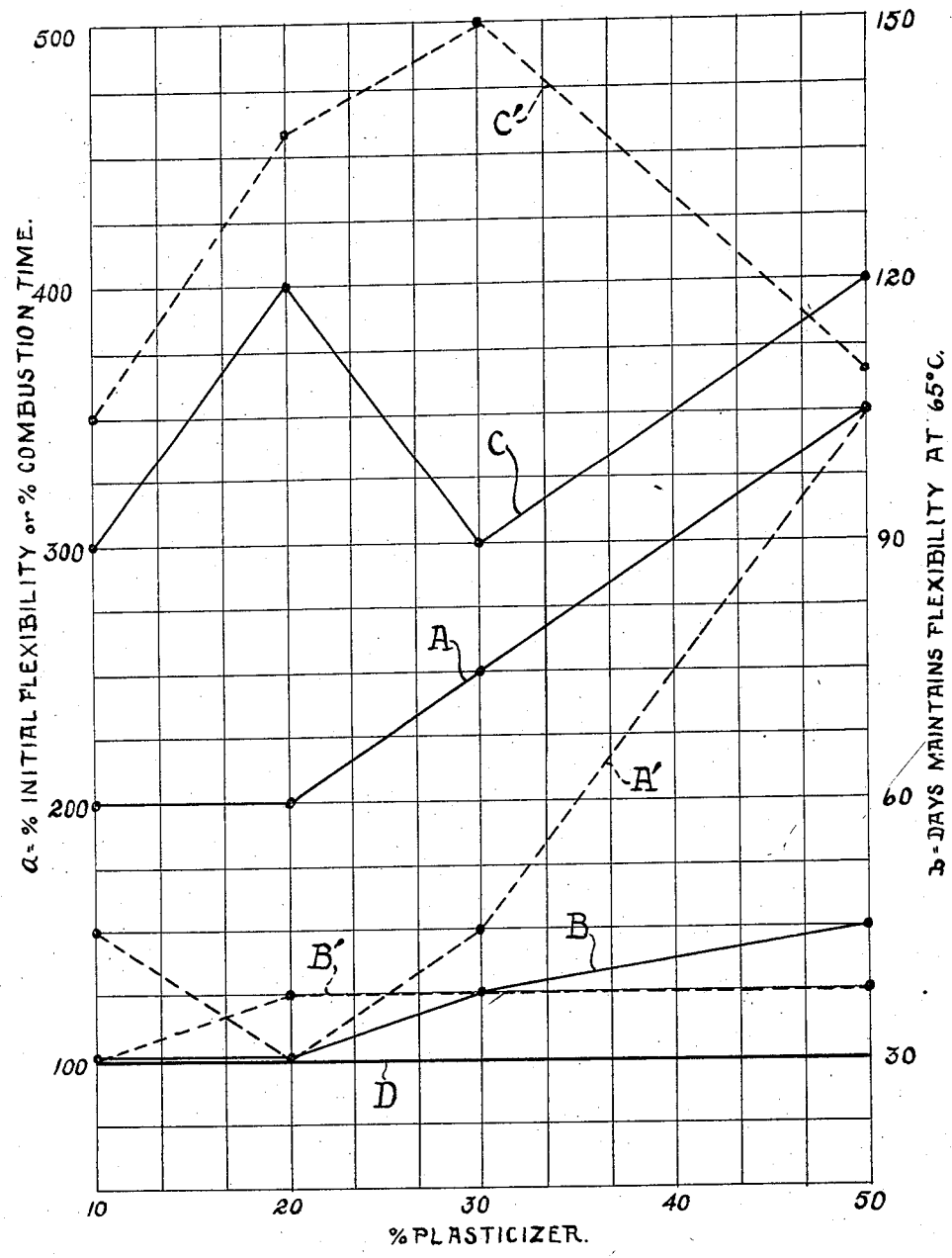
Inventor
Stewart J. Carroll
By Newton M. Perrins
Daniel J. Mayne
Attorneys Patented Oct. 6, 1931

1,826,688

UNITED STATES PATENT OFFICE

STEWART J. CARROLL, OF ROCHESTER, NEW YORK, ASSIGNOR TO EASTMAN KODAK COMPANY, OF ROCHESTER, NEW YORK, A CORPORATION OF NEW YORK

CELLULOSIC COMPOSITION OF MATTER CONTAINING A BROMO COMPOUND

Application filed August 30, 1929. Serial No. 389,451.

This invention relates to compositions of matter in which cellulose derivatives, such as cellulose acetate, cellulose nitrate or cellulose ether, are combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets, photographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce a composition which is capable of easy and convenient manipulation in the plastic and analogous arts, such as in the manufacture of sheets, films, artificial silk filaments, varnishes, lacquers and the like; and to produce a composition which will not injure or be injured by, the substances or surfaces with which it is associated during manufacture, storage or use. Other and further objects will hereinafter become apparent to those skilled in the art to which this invention pertains.

While cellulose acetates, nitrates and others have been known for decades it has also been known that to utilize them in the various plastic arts it is necessary to mix therewith such plasticizing or conditioning agents as camphor, castor oil, triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly addition compounds of various kinds have been employed to increase flexibility, transparency, toughness and other properties which will enhance the value of the resulting product. Addition products for the same or similar purposes are also added to cellulose acetates, nitrates and others to prepare them for use in the other plastic arts, such as in the manufacture of lacquers, varnishes, artificial silk filaments, moulded compounds and the like. While the plasticizers or other addition agents heretofore discovered have had their utility in the art, the increasing use to which cellulose derivatives have been put and the increasing number of desirable properties required of the cellulose derivative for most purposes has made the discovery of new and economical plasticizers or other addition agents a matter of considerable importance to the art.

I have discovered that valuable properties may be induced in and/or contributed to compositions containing cellulose derivatives, such as cellulose acetate, by adding thereto as plasticizing agents either of the bromo compounds para-bromo-benzaldehyde or methyl-meta-bromo-benzoate in the presence of a solvent, such as acetone, which will dissolve both the cellulose derivative and plasticizer. These plasticizers are both solids at ordinary atmospheric temperature and have the structural formulæ:

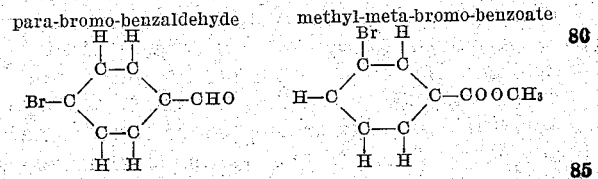

They are each compatible with cellulose derivatives and particularly compatible with cellulose acetate in the percentages hereinafter given. They are not expensive compounds and not particularly difficult to produce, or obtain upon the open market. They are related in that the benzaldehyde will change to a benzoate with heat and air. The particularly useful properties which they each induce in or contribute to a cellulosic composition containing either of them are hereinafter enumerated.

In order that those skilled in this art may better understand my invention I would state, by way of illustration, that for the manufacture of photographic film or other sheets my new composition of matter may be compounded as follows: 100 parts of acetone soluble cellulose acetate i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to 50 parts by weight, of para-bromo-benzaldehyde, it being found preferable to employ approximately 50 parts thereof. Within the limits stated, the amount of plasticizer may be decreased or increased, depending upon whether it is desired to decrease or increase, respectively, the properties which this plasticizer contributes to the finished product. The amount of solvent employed may also be decreased or increased, depending upon whether it is desired to have a more or less freely flowing composition, respectively. In the same manner and in the same proportions, methyl-meta-brombenzoate may be employed as a plasticizer; for the preferred amount of this plasticizer 30 parts may be employed as well as 50 parts.

A composition of matter prepared as above described may be deposited upon any suitable film forming surface to form a film or sheet, as is well known to those skilled in the art. A film so produced has permanently brilliant transparency and exceptionally low inflammability, burning no more readily than ordinary newsprint. Such film is tough and flexible as shown by the fact that it will withstand many folds upon a modified Schopper fold-tester (commonly used for such purposes) without breaking and that even after being subjected for 37 days (in the case of either plasticizer) to air maintained at a temperature of 65° C. the film still maintains flexibility, demonstrating that the film will withstand ordinary usage satisfactorily for many years, whereas a film formed from a mere solution of cellulose acetate in acetone or other similar solvent is brittle and fragile after being subjected to the same treatment for thirty days or even a lesser time. The sum total of the above advantageous properties of a product produced from my new composition is considerably in excess of that of products produced with what have previously been regarded as the better plasticizers.

Other similar solvents (instead of acetone) which are compatible with the cellulose acetate and my new plasticizer may also occur to those skilled in this art. In like manner this plasticizer may be compounded with other single organic esters of cellulose, such as cellulose propionate, butyrate and the like, or with mixed organic and/or inorganic esters, such as cellulose aceto-stearate, aceto-malate, or cellulose nitro-acetate, or with the cellulose ethers, a suitable solvent which will dissolve both the cellulosic derivative and the plasticizer being employed.

The accompanying drawing, forming a part of this application, clearly illustrates the particular advantages of employing my novel plasticizer in the plastic arts. In this drawing there are plotted lines or curves graphically depicting the properties of film produced from a composition containing cellulose acetate and this plasticizer. On the horizontal axis is indicated the various percentages of my plasticizer that may be employed with the cellulosic derivative, this percentage being given in parts added to the cellulose derivative rather than parts of the composition; for instance, 30 parts plasticizer added to 100 parts cellulose acetate is denoted as 30% plasticizer added. On the vertical axis at $(a)$, on the left, is indicated in percentage over the check sample the initial flexibility of a film which has been formed as described from my novel composition and which has been subjected to air at 50° C. for 24 hours to free it of solvent; the rate of combustion of that film is also indicated by this same column $(a)$; at $(b)$ on the right is indicated the length of time in days that the film will maintain flexibility when subjected to air kept at a temperature of 65° C. There are two sets of curves. A, B and C refer to film containing para-bromo-benzaldehyde and A', B' and C' refer to film containing methyl-meta-bromo-benzoate. The (A) curves depict initial flexibility of the film, the (B) curves depict the ability of the film to maintain flexibility and the (C) curves depict the rate of combustion of the film—all with various percentages of my novel plasticizer and all as compared to the respective properties of a film produced from a solution of cellulose acetate in acetone and a hypothetical inert material substituted for the plasticizer as denoted by curve (D) indicating unity of 100% and 30 days for $(a)$ and $(b)$. It will thus be noted that my novel plasticizer has the faculty of giving, to a product produced therefrom, good initial flexibility and an exceptionally low combustion rate, and that the product maintains its flexibility quite well. The combustion rate is lowered slightly more in the case of the preferred percentage of methyl-meta-bromo-benzoate. The preferred percentage of either of these plasticizers which it is desirable to employ to contribute any particular property to the final product will be obvious from an inspection of this drawing; the best percentage to employ will depend upon which property it is desired to feature most in the final product.

In as much as my above described composition of matter is quite useful in the production of films and sheets it will be apparent that my new plasticizer may also be employed with advantage in the other branches of the plastic art. For instance, my above described composition of matter may be employed in the manufacture of artificial silk by the dry spinning method. With the proper coagulating bath it may also be employed for wet spinning. It may be desired to employ a composition of different viscosity or evaporation characteristics but this is a mere matter of changing the solvent proportion or adding evaporation retardants such as triacetin or other high or intermediate boiling constituents, as has been well known in the art for more than a decade. My novel plasticizer may also be employed with advantage in connection with a number of the known lacquer and varnish formulæ with which it may be found to be compatible. In such cases the plasticizer is usually first put into solution with the cellulose derivative solution and if non-solvents are added for the purpose of cheapening the composition they are added only to such an extent as will not precipitate the derivative from solution. Other uses within the scope of my invention will also suggest themselves to those skilled in the art.

What I claim as my invention, and desire to be secured by Letters Patent of the United States, is:

1. A composition of matter comprising a cellulose derivative and one of the bromo-compounds para-bromo-benzaldehyde and methyl-meta-bromo-benzoate.

2. A composition of matter comprising cellulose acetate and one of the bromo-compounds para-bromo-benzaldehyde and methyl-meta-bromo-benzoate.

3. A composition of matter comprising 100 parts of cellulose acetate and approximately 30 parts of one of the bromo-compounds para-bromo-benzaldehyde and methyl-meta-bromo-benzoate.

4. A composition of matter comprising cellulose acetate and para-bromo-benzaldehyde.

5. A composition of matter comprising a cellulose derivative and methyl-meta-bromo-benzoate.

6. A composition of matter comprising cellulose acetate and methyl-meta-bromo-benzoate.

7. A compositon of matter comprising 100 parts cellulose acetate and from 10 to 50 parts, by weight, of methyl-meta-bromo-benzoate.

8. A composition of matter comprising 100 parts of cellulose acetate and approximately 30 to 50 parts, by weight, of methyl-meta-bromo-benzoate.

Signed at Rochester, New York, this 27th day of August, 1929.

STEWART J. CARROLL.